United States Patent
Raszkowski et al.

(10) Patent No.: US 9,194,439 B2
(45) Date of Patent: Nov. 24, 2015

(54) VARIATOR BYPASS CLUTCH

(71) Applicant: Allison Transmission, Inc., Indianapolis, IN (US)

(72) Inventors: James A. Raszkowski, Indianapolis, IN (US); Jeremy A. Turner, Indianapolis, IN (US); Brad Philip Pohl, Leander, TX (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/212,660

(22) Filed: Mar. 14, 2014

(65) Prior Publication Data

US 2014/0262672 A1 Sep. 18, 2014

Related U.S. Application Data

(60) Provisional application No. 61/794,523, filed on Mar. 15, 2013.

(51) Int. Cl.

| | |
|---|---|
| *F16D 25/06* | (2006.01) |
| *F16D 11/14* | (2006.01) |
| *F16D 25/061* | (2006.01) |
| *F16H 15/28* | (2006.01) |
| *F16H 15/06* | (2006.01) |
| *F16D 11/00* | (2006.01) |

(52) U.S. Cl.
CPC .............. *F16D 11/14* (2013.01); *F16D 25/061* (2013.01); *F16H 15/28* (2013.01); *F16D 2011/004* (2013.01); *F16H 15/06* (2013.01)

(58) Field of Classification Search
USPC ................... 475/49; 476/39, 43, 44
See application file for complete search history.

(56) References Cited

U.S. PATENT DOCUMENTS

| | | | |
|---|---|---|---|
| 2,332,593 | A * | 10/1943 | Nutt et al. ........................ 477/64 |
| 2,347,873 | A | 5/1944 | Bloomfield |
| 2,410,818 | A | 11/1946 | Grant |
| 2,554,221 | A | 5/1951 | Stephenson et al. |
| 2,583,843 | A | 1/1952 | Herrick |

(Continued)

FOREIGN PATENT DOCUMENTS

| | | |
|---|---|---|
| EP | 1519084 A2 | 9/2004 |
| WO | 9849455 A2 | 11/1998 |
| WO | 2010048029 A2 | 4/2010 |

OTHER PUBLICATIONS

U.S. Appl. No. 61/794,523, entitled "Variator Bypass Clutch," by James Raszkowski et al., filed Mar. 15, 2013, 31 pages.

(Continued)

*Primary Examiner* — Derek D Knight
*Assistant Examiner* — David Morris
(74) *Attorney, Agent, or Firm* — Barnes & Thornburg LLP

(57) ABSTRACT

A dog clutch operable to bypass a variator of a transmission is disclosed. The dog clutch includes a housing engaged with an input ring of the variator. The dog clutch also includes a piston engaged with the housing and movable from a first position in which the piston is disengaged from an output ring of the variator to a second position in which the piston is engaged with the output ring. The variator input ring and output ring are locked together when the dog clutch is in the second position to prevent the variator from producing continuously variable torque output. The variator is operable to produce continuously-variable torque output when the dog clutch is in the first position.

12 Claims, 5 Drawing Sheets

(56) References Cited

U.S. PATENT DOCUMENTS

| | | | |
|---|---|---|---|
| 2,596,654 A | 5/1952 | Clark et al. | |
| 2,718,292 A | 9/1955 | Meilander et al. | |
| 2,841,330 A | 7/1958 | Brewer et al. | |
| 3,324,744 A | 6/1967 | Roper | |
| 3,385,407 A * | 5/1968 | Kleinhans et al. | 192/53.51 |
| 3,432,016 A | 3/1969 | Vogt | |
| 3,481,436 A | 12/1969 | Wilkowski | |
| 3,631,741 A | 1/1972 | Kelbel | |
| 4,114,478 A | 9/1978 | Clauss | |
| 4,290,320 A * | 9/1981 | Abbott | 475/66 |
| 4,361,217 A | 11/1982 | Bieber et al. | |
| 4,381,828 A | 5/1983 | Lunn et al. | |
| 4,595,087 A | 6/1986 | Morisawa et al. | |
| 4,813,524 A | 3/1989 | Reik | |
| 5,038,884 A | 8/1991 | Hamada et al. | |
| 5,152,726 A | 10/1992 | Lederman | |
| 5,355,981 A | 10/1994 | Itoh et al. | |
| 5,407,024 A | 4/1995 | Watson et al. | |
| 5,441,130 A | 8/1995 | Ha | |
| 5,538,121 A | 7/1996 | Hering | |
| 5,584,776 A | 12/1996 | Weilant et al. | |
| 5,603,660 A * | 2/1997 | Kyle | 464/68.3 |
| 5,653,322 A | 8/1997 | Vasa et al. | |
| 5,662,198 A | 9/1997 | Kojima et al. | |
| 5,704,867 A | 1/1998 | Bowen | |
| 5,771,477 A | 6/1998 | Showalter et al. | |
| 5,833,566 A | 11/1998 | Showalter | |
| 5,884,526 A | 3/1999 | Fogelberg | |
| 5,893,812 A | 4/1999 | Narai et al. | |
| 5,918,715 A | 7/1999 | Ruth et al. | |
| 5,992,592 A | 11/1999 | Showalter | |
| 6,062,361 A | 5/2000 | Showalter | |
| 6,149,540 A | 11/2000 | Johnson et al. | |
| 6,149,543 A | 11/2000 | Breen | |
| 6,155,395 A | 12/2000 | Braford | |
| 6,251,045 B1 | 6/2001 | Oliveira et al. | |
| 6,460,671 B1 | 10/2002 | Karambelas et al. | |
| 6,588,559 B2 | 7/2003 | Blair | |
| 6,672,442 B2 | 1/2004 | Kato et al. | |
| 6,679,367 B2 | 1/2004 | Baker et al. | |
| 6,790,153 B2 | 9/2004 | Goto | |
| 6,834,750 B2 | 12/2004 | Baker et al. | |
| 6,846,257 B2 | 1/2005 | Baker et al. | |
| 7,052,430 B2 | 5/2006 | Stevenson et al. | |
| 7,189,182 B2 | 3/2007 | Stevenson et al. | |
| 7,204,337 B2 | 4/2007 | Wildfellner | |
| 7,219,569 B2 | 5/2007 | Jastrzembowski et al. | |
| 7,770,480 B2 * | 8/2010 | Martin | 74/333 |
| 8,152,673 B2 | 4/2012 | Yanay | |
| 8,298,112 B2 | 10/2012 | Takada | |
| 2002/0005325 A1 | 1/2002 | Yamada | |
| 2003/0051959 A1 | 3/2003 | Blair | |
| 2003/0226415 A1 | 12/2003 | Baker et al. | |
| 2004/0104096 A1 | 6/2004 | Genise | |
| 2004/0214685 A1 | 10/2004 | Korenjak et al. | |
| 2006/0037830 A1 | 2/2006 | Sowul et al. | |

OTHER PUBLICATIONS

U.S. Appl. No. 61/799,200, entitled "Three-Position Dog Clutch," by Brian Schoolcraft, filed Mar. 15, 2013, 31 pages.

U.S. Appl. No. 61/798,476, entitled "Split Power Infinitely Variable Transmission," by Brian Schoolcraft, filed Mar. 15, 2013, 45 pages.

Search Report and Written Opinion of the ISA for Application No. PCT/US2014/028814, dated Aug. 5, 2014, 8 pages.

* cited by examiner

VARIATOR BYPASS CLUTCH

CROSS REFERENCE TO RELATED U.S. APPLICATIONS

This application claims priority to and the benefit of U.S. Provisional Patent Application Ser. No. 61/794,523 entitled "VARIATOR BYPASS CLUTCH," which was filed on Mar. 15, 2013, the entirety of which is incorporated herein by reference.

TECHNICAL FIELD

The present disclosure relates generally to dog clutches, and more particularly, to a dog clutch used in infinitely variable transmissions.

BACKGROUND

A dog clutch is a type of clutch used to couple or lock two components together to transfer rotational power from a driving component to a driven component. For example, dog clutches are often used to couple or lock a driving shaft to a driven shaft, to couple or lock a driving shaft to a gear, and/or to engage one or more torque-transmitting clutches with one or more gears to transfer rotational power from the clutches to the corresponding gears.

Dog clutches are used in many different applications including transmissions of motor vehicles. In general, the transmission of a motor vehicle includes a number of selectively engageable clutches. Selective engagement and/or disengagement of the clutches establishes speed or gear ratios between the transmission input shaft and the transmission output shaft. In particular, shifting from a currently established gear ratio to a new gear ratio generally requires disengaging a clutch (i.e., the "off-going clutch") associated with the current gear ratio and engaging a clutch (i.e., the "oncoming clutch") associated with the desired new gear ratio.

Some motor vehicle transmissions include a variable-ratio unit ("variator") used to provide a continuous variation of transmission ratio rather than a series of predetermined ratios. In such transmissions, known as continuously variable transmissions (CVTs), the variator is coupled between the transmission input shaft and the transmission output shaft via gearing and one or more clutches. In one type of continuously variable transmission, referred to as an infinitely variable transmission (IVT), a zero output speed can be obtained independently of the rotational input speed provided to the transmission by the drive unit in a geared neutral mode. In most infinitely variable transmissions, the variator provides a continuously-varying torque output in each operating mode of the transmission.

SUMMARY

According to one aspect of the present disclosure, a dog clutch comprises a housing and a piston. The housing includes a base, and the housing is engaged with an input ring of a variable-ratio unit included in a transmission. The piston is engaged with the housing and movable between a first position in which the piston is disengaged from an output ring of the variable-ratio unit and a second position in which the piston is engaged with the output ring of the variable-ratio unit to lock the input ring to the output ring to prevent the variable-ratio unit from producing continuously-variable torque output.

In some embodiments, the piston and the housing may define a first cavity. Hydraulic fluid may be provided to the first cavity to move the piston between the first and second positions. The base and the piston may define a second cavity that may contain a spring exerting a biasing force against the piston as the piston moves between the first and second positions. A first force may be exerted by the second cavity against the first cavity during the rotation of the dog clutch that urges the piston toward the first position. A second force may exerted by the first cavity against the second cavity during the rotation of the dog clutch that counteracts the first force so that the piston is moved from the first position to the second position against only the biasing force of the spring.

In some embodiments, the piston may include a plurality of external splines and the output ring may include a plurality of internal splines. The plurality of internal splines may be configured to engage the plurality of external splines in the second position. Backlash between the external splines and the internal splines may be at least 2 degrees, no greater than 6 degrees, or between 2 degrees and 6 degrees.

In some embodiments, the piston may apply a piston force to the spring to overcome the biasing force of the spring as the piston is moved from the first position to the second position. The piston force may be applied to the spring independently of the rotational speed of the dog clutch.

In some embodiments, movement of hydraulic fluid in the first cavity as the dog clutch is rotating may create the second force. The second force may be a first centrifugal pressure force. Hydraulic fluid may be provided to the second cavity. Movement of hydraulic fluid in the second cavity as the dog clutch is rotating may create the first force. The first force may be a second centrifugal pressure force.

In some embodiments, the piston may include a plurality of external splines and the housing may include a plurality of internal splines. The plurality of external splines may be engaged with the plurality of internal splines in each of the first position and the second position.

According to another aspect of the present disclosure, a transmission comprises a variable-ratio unit producing continuously-variable torque output, a housing, and a piston. The variable-ratio unit includes an input ring and an output ring. The housing includes a base and is engaged with the input ring. The piston is engaged with the housing and movable between a first position in which the piston is disengaged from the output ring and a second position in which the piston is engaged with the output ring to lock the input ring to the output ring so that the variable-ratio unit produces a fixed torque output.

In some embodiments, the piston and the housing may define a first cavity. Hydraulic fluid may be provided to the first cavity to move the piston between the first and second positions. The base and the piston may define a second cavity that may contain a spring exerting a biasing force against the piston as the piston moves between the first and second positions. Hydraulic fluid may be provided to the second cavity. A first centrifugal pressure force may be exerted by the second cavity against the first cavity during the rotation of the dog clutch that urges the piston toward the first position. A second centrifugal pressure force may be exerted by the first cavity against the second cavity during the rotation of the dog clutch that counteracts the first centrifugal pressure force so that the piston is moved from the first position to the second position against only the biasing force of the spring.

In some embodiments, movement of hydraulic fluid in the second cavity as the dog clutch is rotating may create the first centrifugal pressure force. The piston may apply a piston force to the spring to overcome the biasing force of the spring as the piston is moved from the first position to the second position. The piston force may be applied to the spring independently of the rotational speed of the dog clutch.

In some embodiments, the spring may include a horizontal section and a vertical section. The vertical section may be positioned in substantially perpendicular relation to the horizontal section. The piston may move between the first position and the second position in a direction substantially parallel to the horizontal section. The horizontal section of the spring may be compressed as the piston moves from the first position to the second position. The horizontal section of the spring may be extended as the piston moves from the second position to the first position. The horizontal section of the spring may contact a stop of the transmission to limit compression of the horizontal section of the spring as the piston moves from the first position to the second position.

In some embodiments, the variable-ratio unit may further comprise an adjustment nut that may be used to set an axial preload on the variable-ratio unit. The adjustment nut may comprise a plurality of tabs. The base may include a plurality of slots that may be configured to engage the plurality of tabs of the adjustment nut as the piston moves between the first position and the second position.

According to another aspect of the present disclosure, a method for selectively bypassing a variable-ratio unit included in a transmission using a dog clutch comprises engaging a housing of the dog clutch with an input ring of the variable ratio-unit so that a piston of the dog clutch is engaged with the housing and disengaged from an output ring of the variable-ratio unit in a first position. The method further comprises moving the piston to a second position in which the piston is engaged with the output ring so that the dog clutch locks the input ring to the output ring to prevent the variable-ratio unit from producing continuously-variable torque output.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
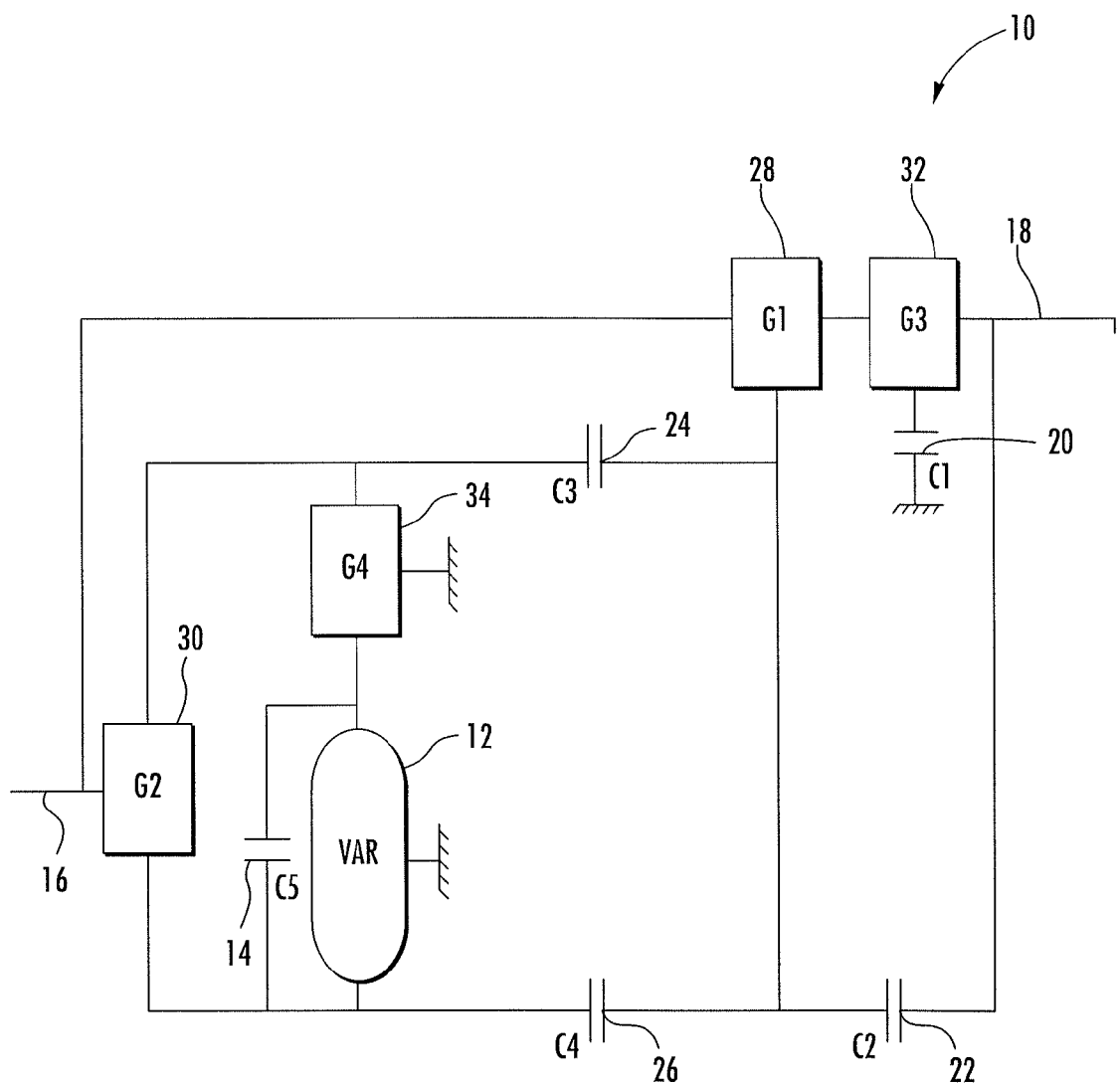
FIG. 1 is a simplified block diagram of an embodiment of an infinitely variable transmission showing various components included therein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a transmission 10 includes a variator 12 and a dog clutch 14. The transmission 10 also includes a transmission input shaft 16 and a transmission output shaft 18. Each of the variator 12 and the dog clutch 14 is positioned between the input shaft 16 and the output shaft 18 and selectively operatively coupled to the shafts 16, 18 via various clutches of the transmission 10 as discussed below. The transmission 10 may be included as a part of a motor vehicle that also includes a drive unit (not shown) and a vehicle load (not shown).

The drive unit may be embodied as any type of motor or internal combustion engine having a reciprocating or a rotary configuration that provides rotational power to the transmission 10 and therethrough to the vehicle load. For instance, the drive unit may be embodied as a four-stroke piston engine, a diesel engine, or a rotary engine. The vehicle load may be embodied as, or otherwise include, drive wheels, caterpillar tracks, propels, etc. that impart the motor vehicle with locomotion when driven by the drive unit via the transmission 10.

Rotational power (also referred to herein as torque) generated by the drive unit may be transmitted to the transmission 10 via a drive unit output shaft (not shown) included in the drive unit, which is coupled to the transmission input shaft 16. Additionally, rotational power from the transmission 10 may be transmitted from the transmission output shaft 18 to the vehicle load.

The transmission 10 may ensure the controlled application of rotational power generated by the drive unit to the vehicle load. As discussed in more detail below, the transmission 10 includes a plurality of gearsets that enable speed and torque generated by the drive unit to be converted for use by the vehicle load. Additionally, as discussed below, the transmission 10 includes a plurality of torque-transmitting mechanisms (e.g., clutches) configured to define torque transfer paths between the input shaft 16 and the output shaft 18 and thereby effect a change from one operating mode of the transmission 10 to another operating mode.

The transmission 10 is illustratively shown in FIG. 1 as an infinitely variable transmission having a split power architecture that achieves both transmission ratios varying within defined ranges (i.e., continuously-variable torque output) and fixed transmission ratios (i.e., non-continuously-variable or fixed torque output). One illustrative infinitely variable transmission with which the dog clutch 14 and the related technologies disclosed herein may be used is disclosed in U.S. Provisional Patent App. Ser. 61/798,476, entitled "Split Power Infinitely Variable Transmission Architecture," the entirety of which is hereby incorporated by reference.

The plurality of clutches includes a first clutch 20, a second clutch 22, a third clutch 24, a fourth clutch 26, and the dog clutch 14. The dog clutch 14 is operable to bypass the variator 12 to prevent the variator 12 from producing continuously-variable torque output, similar to the variator bypass clutch disclosed in U.S. Provisional Patent App. Ser. No. 61/798,476, entitled "Split Power Infinitely Variable Transmission Architecture," the entirety of which is hereby incorporated by reference.

Each of the clutches 14, 20, 22, 24, 26 is a torque-transmitting device positioned between the input shaft 16 and the output shaft 18 and configured to define a torque transfer path between the input shaft 16 and the output shaft 18 and thereby effect a change from one operating mode of the transmission 10 to another operating mode as indicated above. Each of the clutches 14, 20, 22, 24, 26 is engageable to transmit torque along a particular path and disengageable to prevent torque from being transmitted along the path. In some embodiments, one or more of the clutches 20, 22, 24, 26 may be embodied as a three-position dog clutch such as the three-position dog clutch disclosed in U.S. Provisional Patent App. Ser. No. 61/799,200, entitled "Three-Position Dog Clutch," the entirety of which is hereby incorporated by reference. Illustratively, the dog clutch 14, the second clutch 22, the third clutch 24, and the fourth clutch 26 are rotating clutches while the first clutch 20 is a stationary, non-rotating clutch. Of course, other types of clutches may be used in other embodiments. Additionally, the transmission 10 may include additional or fewer clutches in some embodiments.

The gearsets included in the transmission 10 are represented by boxes (i.e., G1, G2, G3, and G4) in FIG. 1, and the variator 12 is designated as "VAR." Illustratively, the transmission 10 includes a first gearset 28, a second gearset 30, a third gearset 32, and a fourth gearset 34. Each one of the gearsets is positioned between the input shaft 16 and the output shaft 18. The clutches are each represented by pairs of parallel lines in FIG. 1 and are designated as the following: C1 (the first clutch 20), C2 (the second clutch 22), C3 (the third clutch 24), C4 (the fourth clutch 26), and C5 (the dog clutch 14).

The dog clutch 14, as discussed below, is operable to lock an input ring 36 (see FIG. 2) included in the variator 12 to an output ring 38 included in the variator 12 so that the variator 12 achieves a 1:1 ratio (i.e., variator input speed is equal to variator output speed). When the input ring 36 of the variator 12 is locked to the output ring 38 of the variator 12, the dog clutch 14 is "engaged" so that the variator 12 produces a fixed torque output (i.e., non-continuously-variable torque output). Conversely, when the input ring 36 of the variator 12 is not locked to the output ring 38 of the variator 12, the dog clutch is said to be "disengaged" so that the variator 12 produces a continuously-variable torque output.

Figure 2:
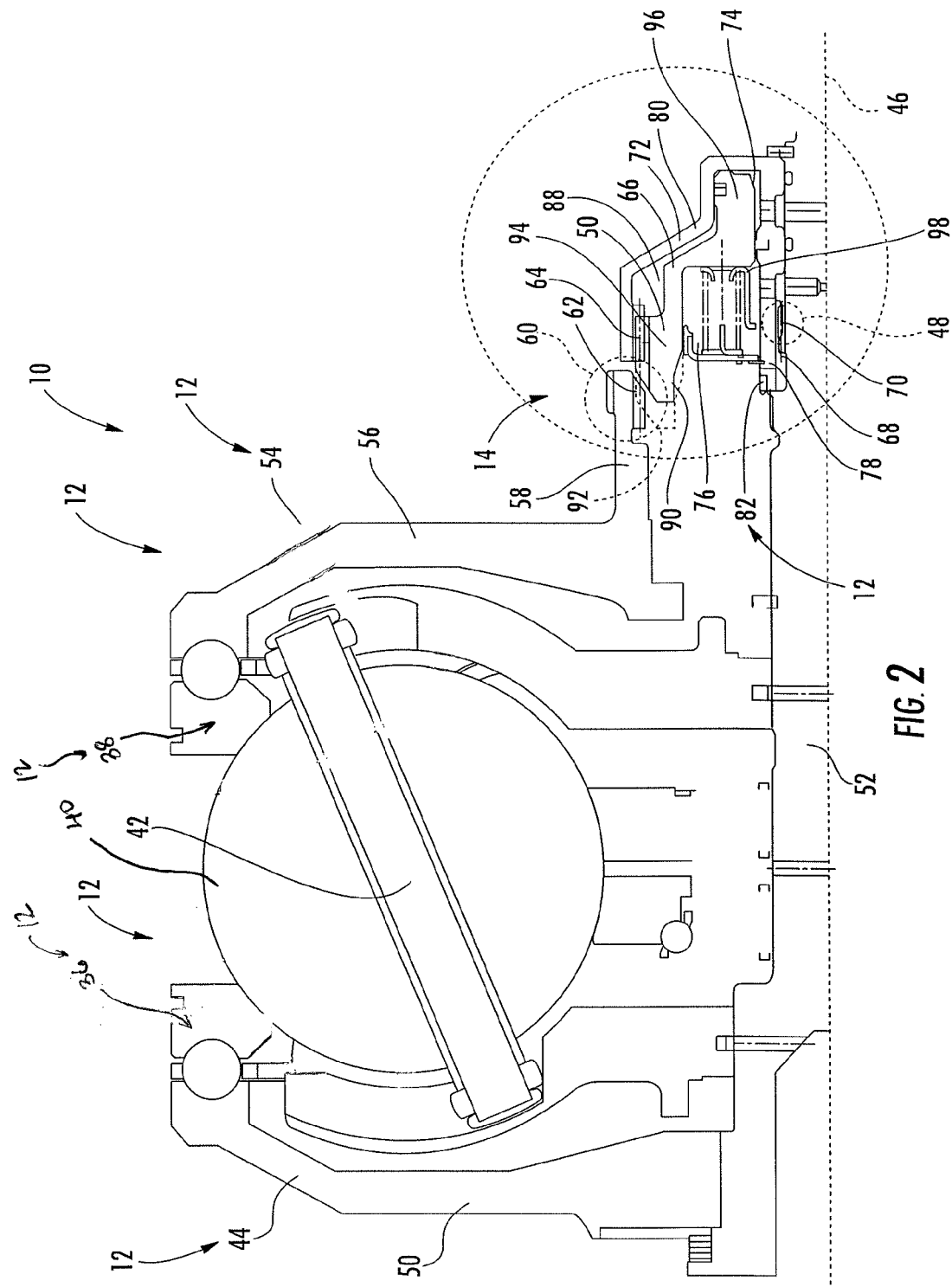
FIG. 2 is a partial view of the transmission of FIG. 1 showing a variator and an associated dog clutch included in the transmission.

As discussed above and shown in FIG. 2, the variator 12 includes the input ring 36 and the output ring 38. The variator 12 is illustratively embodied as a planetary-type ball variator. Each of the variator rings 36, 38 are spaced apart as shown in FIG. 2 to permit a ball 40 to be positioned between the rings 36, 38. The ball 40 is configured to tilt between the input rings 36, 38 to vary the ratio achieved using the variator 12. An axle 42 encircles the ball 40 as shown in FIG. 2. The ball 40 is tilted by continuously tilting the axle 42 so that continuously-variable torque output is produced using the variator 12.

As shown in FIG. 2, the input ring 36 is engaged with the dog clutch 14 through an input plate 44 included in the variator 12 that extends below the input ring 36 relative to a centerline 46 of the variator 12. The input plate 44 is coupled to the input ring 36 and is engaged with the dog clutch 14 in the engagement region 48 as discussed below. The input plate 44 includes a first section 50 extending toward the centerline 46 in a direction that is substantially perpendicular to the centerline 46. The input plate 44 also includes a second section 52 extending away from the first section 50 and to the engagement region 48 along the centerline 46. The second section 52 is generally parallel to the centerline 46 as shown in FIG. 2.

Engagement between the input plate 44 and the dog clutch 14 in the engagement region 48 couples the input ring 36 to the dog clutch 14 so that the input ring 36 is effectively engaged with the dog clutch 14. In other words, the input plate 44 engages the input ring 36 with the dog clutch 14 so that torque is transmitted from the input ring 36 to the dog clutch 14 through the input plate 44.

As shown in FIG. 2, the output ring 38 is engageable with the dog clutch 14 through an output plate 54 included in the variator 12 that extends below the output ring 38 relative to the centerline 46 and toward the dog clutch 14 in a direction substantially parallel to the centerline 46. The output plate 54 is coupled to the output ring 38 and engageable with the dog clutch 14 in the engagement region 60 as discussed below. The output plate 54 includes a first section 56 extending toward the centerline 46 in a direction that is substantially perpendicular to the centerline 46. The output plate 54 also includes a second section 58 extending away from the first section 54 and to the engagement region 60. The second section 58 is generally parallel to the centerline 46.

Engagement between the output plate 54 and the dog clutch 14 in the engagement region 60 couples the output ring 38 to the dog clutch 14 so that the output ring 38 is effectively engaged with the dog clutch 14. In other words, the output plate 54 may engage the output ring 38 with the dog clutch 14 so that torque is transmitted from the output ring 38 to the dog clutch 14 through the output plate 54.

The output plate 54 includes a plurality of internal splines 62 formed in the second section 58 in the engagement region 60 as shown in FIG. 2. As discussed below, each of the plurality of internal splines 62 is configured to engage an external spline 64 of a piston 66 included in the dog clutch 14 so that the output ring 38 is engaged with the piston 66 through the output plate 54.

Figure 3:
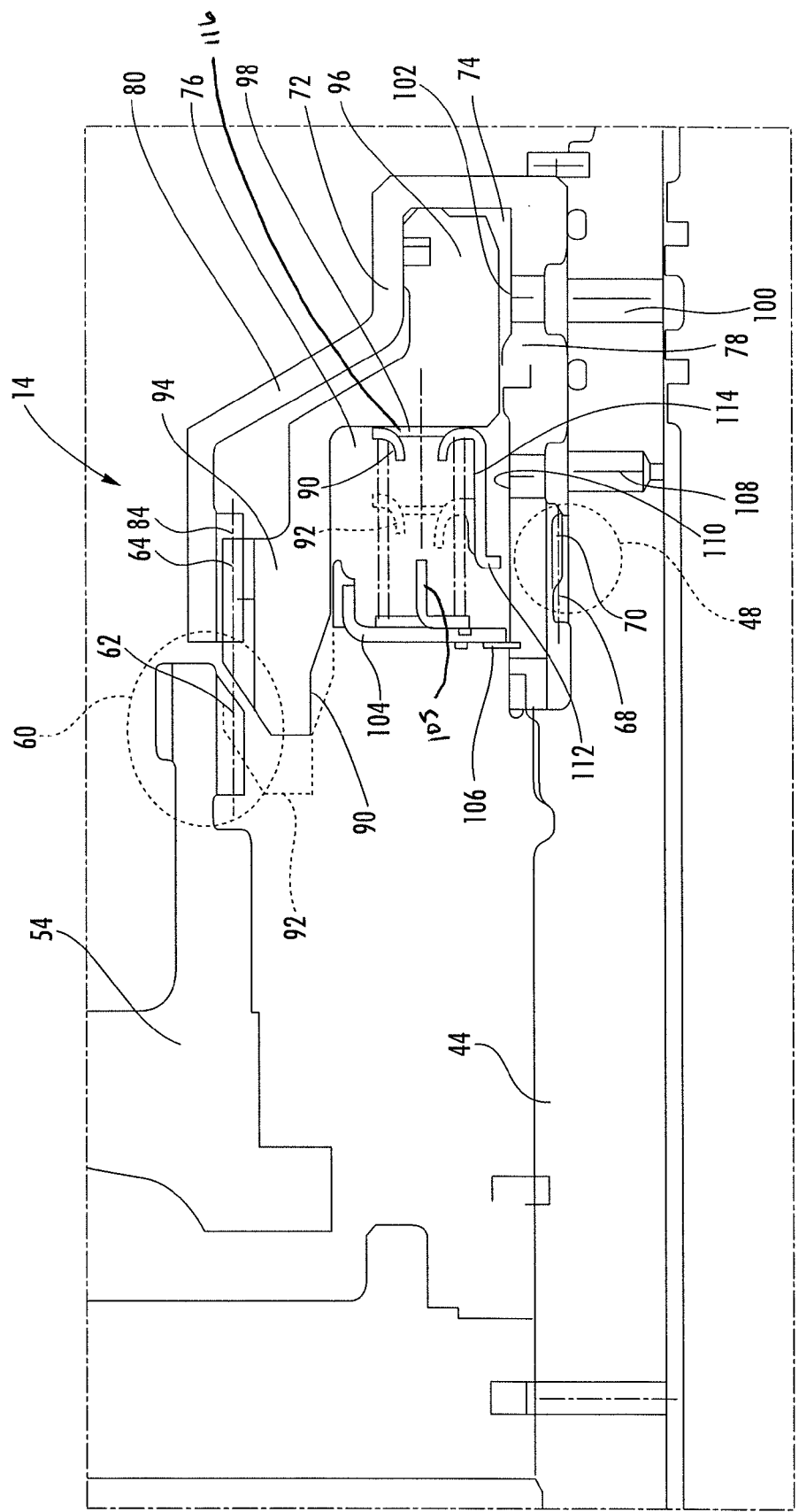
FIG. 3 is a magnified view of a portion of the transmission of FIG. 2 showing the dog clutch and the various associated components of the transmission.

The input plate 44 includes a plurality of external splines 68 formed in the second section 52 in the engagement region 48 as suggested in FIG. 2 and shown in FIG. 3. As discussed below, each of the plurality of external splines 68 is engaged with an internal spline 70 of a housing 72 included in the dog clutch 14 so that input ring 36 is engaged with the housing 72 through the input plate 44.

The housing 72 includes a base 78 and an upper section 80. The base 78 extends in a direction substantially parallel to the centerline 46 through the engagement region 48 and to a variator adjustment nut (not shown) included in the variator 12. The base 78 includes the plurality of internal splines 70 that are engaged with the plurality of external splines 68 formed in the second section 52 of the input plate 44 as shown in FIGS. 2-3. As discussed below, the internal splines 70 are engaged with the external splines 68 as the piston 66 moves between a first position 90 and a second position 92.

The upper section 80 included in the housing 72 extends away from the base 78 and toward the engagement region 60. The upper section 80 includes a plurality of internal splines 84 that are engaged with the plurality of external splines 64 included in the piston 66 as shown in FIGS. 2-3. As discussed below, the internal splines 84 are engaged with the external splines 64 as the piston 66 moves between the first position 90 and the second position 92.

The piston 66 is positioned in an interior space 88 defined by the housing 72, and as shown in FIGS. 2-3, the piston 66 is movable in the interior space 88 between the first position 90 and the second position 92. The shape of the piston 66 is sympathetic to the shape of the upper section 80 of the housing 72. The piston 66 includes an upper section 94 extending toward the engagement region 60 and a lower section 96 extending away from the upper section 94 and toward a first cavity 74 defined between the piston 66 and the housing 72. The upper section 94 includes the plurality of external splines 64 that are engaged with the plurality of internal splines 84 of the housing 72 as the piston 66 moves between the first position 90 and the second position 92. The lower section 96 abuts a spring 98 included in the dog clutch 14 that, as discussed below, exerts a biasing force against the piston 66 as the piston 66 moves between the first position 90 and the second position 92.

As shown in FIG. 3, a first fluid passage 100 extends through the second section 52 of the input plate 44 and through the base 78 of the housing 72 so that a first fluid port 102 is formed in the base 78. Hydraulic fluid communicated through the first fluid passage 100 is expelled from the first fluid port 102 into the first cavity 74 where the hydraulic fluid is contained therein. The first cavity 74 is pressurized by the hydraulic fluid so that the piston 66 is urged toward the second position 92 as suggested in FIGS. 2-3.

A second cavity 76 is defined between the piston 66 and the base 78 of the housing 72 as shown in FIG. 3. The upper and lower sections 94, 96 of the piston 66, the base 78, a seal 104, and a retaining ring 106 cooperate to enclose the second cavity 76 as shown in FIG. 3. The seal 104 is engaged with both the upper section 94 of the piston 66 and the retaining ring 106 and extends therebetween as shown in FIG. 3. The retaining ring 106 is engaged with both the seal 104 and the base 78 of the housing 72 and extends therebetween as also shown in FIG. 3. The spring 98 is contained in the second cavity 76. A second fluid passage 108 extends through the second section 52 of the input plate 44 and through the base 78 of the housing 72 so that a second fluid port 110 is formed in the base 78. Hydraulic fluid communicated through the second fluid passage 108 is expelled from the second fluid port 110 into the second cavity 76 where the hydraulic fluid is contained therein. Hydraulic fluid is provided to the second cavity 76 so that the piston 66 is urged toward the first position 90 as suggested in FIGS. 2-3.

In FIG. 3, the piston 66 is shown in the first position 90 in which the plurality of external splines 64 are disengaged from the plurality of internal splines 62 of the output plate 54 and the dog clutch 14 is "disengaged". The external splines 64 are engaged with the internal splines 84 of the housing 72 and the internal splines 70 of the housing 72 are engaged with the external splines 68 of the input plate 44 in the first position 90. The spring 98 exerts a biasing force against the piston 66 urging the piston 66 toward the housing 72 in the first position 90 as suggested in FIG. 3.

The spring 98 includes a tang 112, a horizontal section 114 extending away from the tang 112 and toward the lower section 96 of the piston 66 in a direction substantially parallel to the centerline 46, and a vertical section 116 extending away from the horizontal section 114 and toward the upper section 94 of the piston 66 in a direction substantially perpendicular to the centerline 46. The tang 112 is coupled to the base 78 and the vertical section 116 abuts the lower section 96 of the piston 66 in the first position 90 as shown in FIG. 3.

Hydraulic fluid is communicated through the first fluid passage 100 and into the first cavity 74 via the first fluid port 102. Once the hydraulic fluid is provided to the first cavity 74, the piston 66 applies a piston force to the spring 98 to overcome the biasing force of the spring 98 so that the piston 66 moves toward the second position 92. As the dog clutch 14 rotates, a first centrifugal pressure force is created by movement of hydraulic fluid in the first cavity 74. The first centrifugal pressure force is exerted by the first cavity 74 against the second cavity 76 in the same direction as the piston force applied to the spring 98 by the piston 66.

Hydraulic fluid is also communicated through the second fluid passage 108 into the second cavity 76 via the second fluid port 110. As the dog clutch 14 rotates, a second centrifugal pressure force is created by movement of hydraulic fluid in the second cavity 76. The second centrifugal pressure force is exerted by the second cavity 76 against the first cavity 74 and counteracts the first centrifugal pressure force so that the piston 66 moves toward the second position 92 against only the biasing force of the spring 98.

Hydraulic fluid may be provided to the first and second cavities 74, 76 simultaneously at the startup of the transmission 10. Each of the cavities 74, 76 may remain filled with hydraulic fluid during the operation of the transmission 10 to facilitate the engagement of the dog clutch 14 as shifts between operating modes of the transmission 10 are made.

Although the first and second centrifugal pressure forces will vary depending on the rotational speed of the dog clutch 14, such variation is effectively negated because the first and second centrifugal pressure forces are substantially equal in magnitude and opposite in direction. Therefore, the piston force is applied by the piston 66 to the spring 98 to overcome the biasing force as the piston 66 is moved from the from the first position 90 to the second position 92 independently of the rotational speed of the dog clutch 14.

The piston 66 and the spring 98 are shown in dashed lines in FIG. 3 to indicate the movement of the piston 66 to the second position 92. The plurality of external splines 64 included in the piston 66 are engaged with the plurality of internal splines 62 included in the output plate 54 in the engagement region 60 so that the piston 66 is effectively engaged with the output ring 38 of the variator 12. At the same time, the piston 66 is engaged with the housing 72 (external splines 64 engaged with internal splines 84) and the housing 72 is engaged with the input plate 44 in the engagement region 48 (internal splines 70 engaged with external splines 68) so that the piston 66 is effectively engaged with the input ring 36. Thus, the dog clutch 14 is "engaged" in the second position 92 such that the input ring 36 and the output ring 38 are locked together, thereby preventing the variator 12 from producing continuously variable torque output (i.e., a fixed torque output). The variator 12, therefore, is effectively bypassed when the piston 66 is moved to the second position 92.

As suggested in FIG. 3, the horizontal section 114 of the spring 98 is compressed as the piston 66 moves from the first position 90 to the second position 92 (see the dashed spring 98 in the second position 92). The horizontal section 114 of the spring 98 is extended as the piston 66 moves from the second position 92 to the first position 90. The vertical section 116 of the spring 98 engages the lower section 96 of the piston 66 as the piston 66 moves between the first position 90 and the second position 92. As suggested in FIG. 3, compression of the horizontal section 114 of the spring 98 as the piston 66 moves from the first position 90 to the second position 92 is limited by a stop 105 of the seal 104. The stop 105 contacts the vertical section 116 of the spring 98 in the second position 92 to prevent the spring 98 from being over-compressed as the piston moves from the first position 90 to the second position 92.

The base 78 of the housing 72 is engaged with the adjustment nut 82 included in the variator 12. The adjustment nut 82 is used to set an initial axial preload of the variator 12. The adjustment nut 82 illustratively has a substantially cylindrical shape and includes a pair of radial tabs (not shown) arranged on a circular surface of the adjustment nut 82 that faces the base 78 of the housing 72. The base 78 illustratively has a substantially cylindrical shape and includes a pair of radial slots (not shown) formed in a circular surface of the base 78 that faces the adjustment nut 82. The tabs of the adjustment nut 82 are configured to be received by the slots of the base 78 so that the base 78 is engaged with the adjustment nut 82, thereby preventing the adjustment nut 82 from loosening as suggested in FIG. 3.

Figure 4:
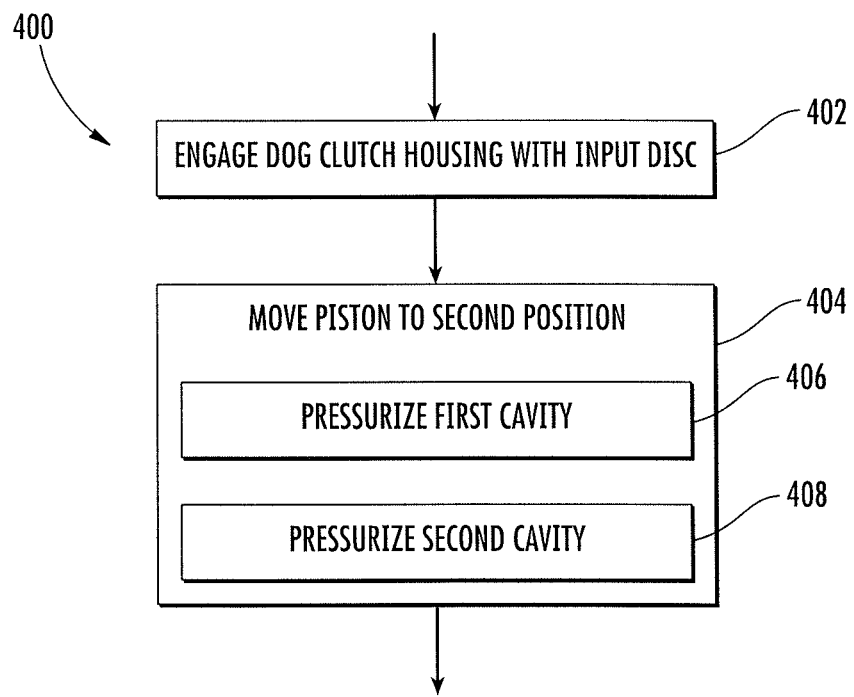
FIG. 4 is a simplified flow diagram of a method for selectively bypassing the variator of FIG. 2.

Referring to FIG. 4, a method 400 for selectively bypassing the variator 12 using the dog clutch 14 is shown. The method 400 begins with block 402 in which the housing 72 of the dog clutch 14 is engaged with the input ring 36 (i.e., through the input plate 44) of the variator 12 so that the piston 66 is engaged with the housing 72 and disengaged from the output ring 38 of the variator 12 in the first position 90. It should be understood that the housing 72 is engaged with the input ring 36 at all times as the piston 66 is moved between the first position 90 and the second position 92. In block 404, the piston 66 is moved to the second position 92 in which the piston 66 is engaged with the output ring 38 (i.e., through the output plate 54) so that the dog clutch 14 locks the input ring 36 to the output ring 38 to prevent the variator 12 from producing a continuously-variable torque output. To do so, in sub-block 406, hydraulic fluid is provided to the first cavity 74 to move the piston 66 from the first position 90 toward the second position 92. Additionally, in sub-block 408, hydraulic fluid is provided to the second cavity 76 to counteract the first centrifugal pressure force exerted by the first cavity 74 against the second cavity 76 so that the piston 66 moves from the first position 90 to the second position 92 against only the biasing force of the spring 98.

Figure 5:
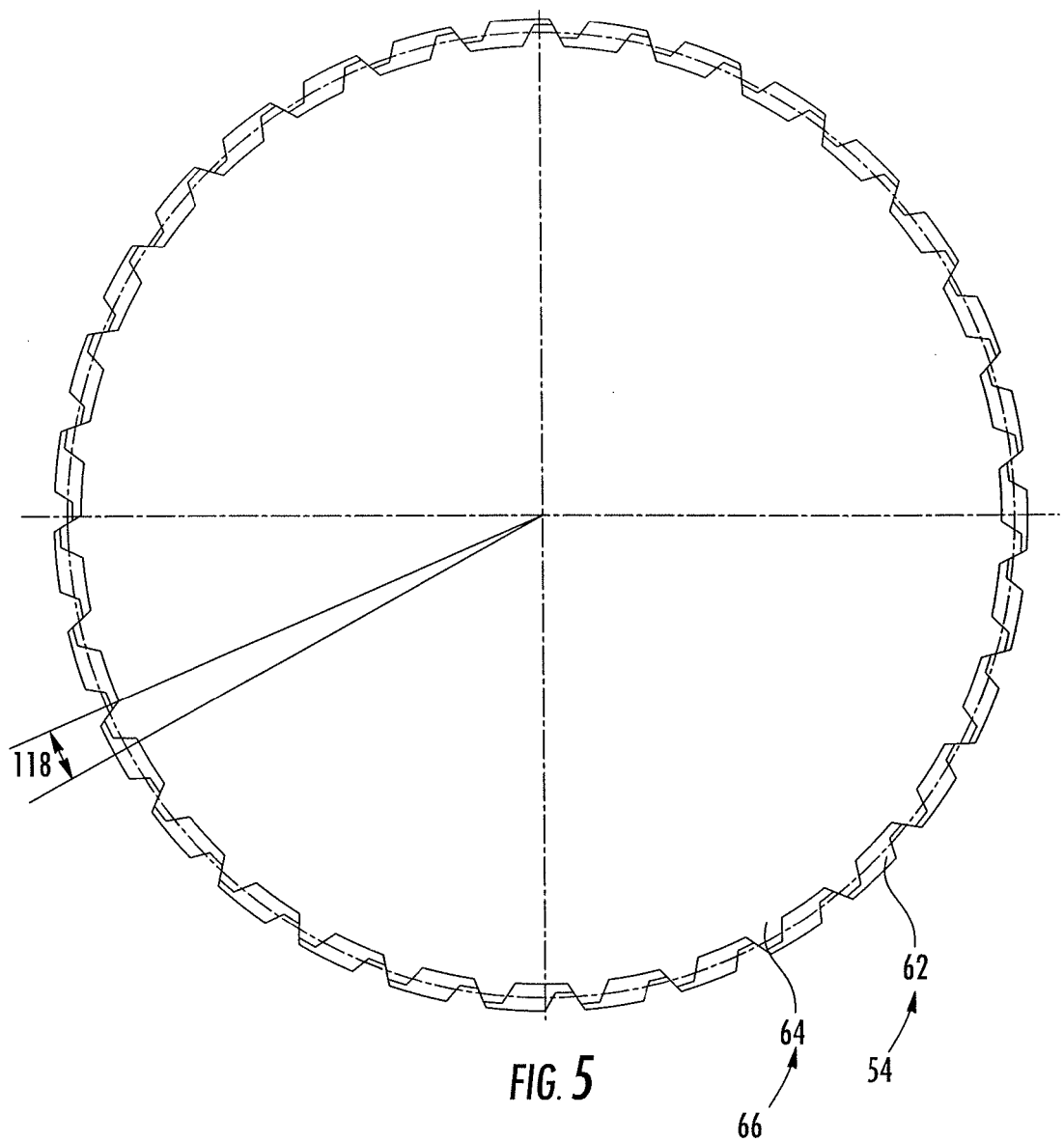
FIG. 5 is a simplified rear view of a variator output ring included in the variator of FIG. 2 and a piston included in the dog clutch of the transmission of FIG. 1.

Referring now to FIG. 5, the plurality of external splines 64 of the piston 66 are shown engaged with the plurality of internal splines 62 of the output plate 54 of the variator 12. Each of the external splines 64 is engaged with one of the internal splines 62 so that there is backlash 118 therebetween. "Backlash" refers to rotational clearance between mating components, and backlash 118 is defined herein as the clearance between each of the splines 64, 62.

Backlash 118 is used to account for speed differentials between mating components, i.e. the piston 66 of the dog clutch 14 and the output plate 54 of the variator 12. Backlash 118 permits each external spline 64 to rotate within a specified angle of rotation until each spline 64 engages the corresponding internal spline 62. In this way, when the output plate 54 and the piston 66 rotate at different speeds, backlash 118 facilitates engagement between the output plate 54 and the piston 66. Engagement between components of the variator 12 and the dog clutch 14 takes place at substantially synchronized speeds (i.e. the rotational speed of the output plate 54 is substantially synchronized with the rotational speed of the piston 66). Backlash 118 allows for engagement between the variator 12 and the dog clutch 14 to occur despite minimal differences in rotational speed between the variator 12 and the dog clutch 14. In the illustrative embodiment of FIG. 4, the backlash 118 is approximately 5 degrees. However, in other embodiments, the backlash 118 may between 2 degrees or greater and 6 degrees or less.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A dog clutch comprising:
   a housing including a base, the housing engaged with an input ring of a planetary-type variator included in a continuously-variable transmission; and
   a piston engaged with the housing, the piston movable between a first position in which the piston is disengaged from an output ring of the planetary-type variator and a second position in which the piston is engaged with the output ring of the planetary-type variator to lock the input ring to the output ring to prevent the planetary-type variator from producing continuously-varying torque output.

2. The dog clutch of claim 1, wherein the piston and the housing define a first cavity, and wherein hydraulic fluid is provided to the first cavity to move the piston between the first and second positions.

3. The dog clutch of claim 2, wherein the base and the piston define a second cavity containing a spring exerting a biasing force against the piston as the piston moves between the first and second positions.

4. The dog clutch of claim 3, wherein a first force is exerted by hydraulic fluid provided to the second cavity against the first cavity during the rotation of the dog clutch that urges the piston toward the first position and a second force is exerted by the hydraulic fluid provided to the first cavity against the second cavity during the rotation of the dog clutch that counteracts the first force so that the piston is moved from the first position to the second position against only the biasing force of the spring.

5. The dog clutch of claim 4, wherein the piston includes a plurality of external splines and the output ring includes a plurality of internal splines configured to engage the plurality of external splines in the second position, and wherein backlash between the external splines and the internal splines is at least 2 degrees.

6. The dog clutch of claim 5, wherein the backlash is no greater than 6 degrees.

7. The dog clutch of claim 5, wherein the backlash is between 2 degrees and 6 degrees.

8. The dog clutch of claim 5, wherein the piston includes a plurality of external splines and the housing includes a plurality of internal splines, and wherein the plurality of external splines are engaged with the plurality of internal splines in each of the first position and the second position.

9. The dog clutch of claim 4, wherein the piston applies a piston force to the spring to overcome the biasing force of the spring as the piston is moved from the first position to the second position, and wherein the piston force is applied to the spring independently of the rotational speed of the dog clutch.

10. The dog clutch of claim 9, wherein movement of hydraulic fluid in the first cavity as the dog clutch is rotating creates the second force.

11. The dog clutch of claim 10, wherein hydraulic fluid is provided to the second cavity, and wherein movement of hydraulic fluid in the second cavity as the dog clutch is rotating creates the first force.

12. A method for selectively bypassing a planetary-type variator of a continuously-variable transmission using a rotating dog clutch, the method comprising:
- engaging a housing of the dog clutch with an input ring of the planetary-type variator so that a piston of the dog clutch is (i) engaged with the housing and (ii) disengaged from an output ring of the planetary-type variator in a first position, and
- moving the piston to a second position in which the piston is engaged with the output ring so that the dog clutch locks the input ring to the output ring to prevent the planetary-type variator from producing continuously-variable torque output.

\* \* \* \* \*